(12) United States Patent
Ishikawa et al.

(10) Patent No.: US 6,897,576 B2
(45) Date of Patent: May 24, 2005

(54) REGENERATIVE BRAKE

(75) Inventors: Sakae Ishikawa, Nagoya (JP); Tsutomu Saito, Nagoya (JP); Kenji Sato, Nagoya (JP); Shigeyuki Kato, Nagoya (JP)

(73) Assignee: Central Japan Railway Company, Nagoya (JP)

( * ) Notice: Subject to any disclaimer, the term of this patent is extended or adjusted under 35 U.S.C. 154(b) by 40 days.

(21) Appl. No.: 10/311,045

(22) PCT Filed: Jun. 11, 2001

(86) PCT No.: PCT/JP01/04928

§ 371 (c)(1),
(2), (4) Date: Dec. 11, 2002

(87) PCT Pub. No.: WO01/96138

PCT Pub. Date: Dec. 20, 2001

(65) Prior Publication Data

US 2003/0189380 A1 Oct. 9, 2003

(30) Foreign Application Priority Data

Jun. 13, 2000 (JP) ........................................ 2000-176803

(51) Int. Cl.[7] ................................................. H02P 9/00
(52) U.S. Cl. .................................. 290/45; 290/3; 322/1
(58) Field of Search ................................. 290/1 A, 1 R, 290/3, 45; 322/1, 100; 316/1; 318/1, 362, 375

(56) References Cited

U.S. PATENT DOCUMENTS

| | | | | |
|---|---|---|---|---|
| 3,799,284 A | * | 3/1974 | Hender ....................... 180/65.2 |
| 4,377,975 A | * | 3/1983 | Scott et al. ................. 105/96.1 |
| 4,994,003 A | * | 2/1991 | Oldfield ....................... 475/72 |
| 5,053,632 A |   | 10/1991 | Suzuki et al. .................. 290/45 |
| 5,283,470 A | * | 2/1994 | Hadley et al. ................. 290/45 |
| 5,340,202 A | * | 8/1994 | Day ............................. 303/19 |
| 5,442,276 A | * | 8/1995 | Schwartz et al. ............. 322/25 |
| 5,915,306 A | * | 6/1999 | Langhorst et al. ....... 105/157.1 |

FOREIGN PATENT DOCUMENTS

| | | |
|---|---|---|
| JP | 61-266064 | 11/1986 |
| JP | 63-314101 | 12/1988 |
| JP | 64-030401 | 2/1989 |
| JP | 04-207911 | 7/1992 |
| JP | 04-322106 | 11/1992 |
| JP | 2000-037002 | 2/2000 |

* cited by examiner

*Primary Examiner*—Nicholas Ponmarenko
(74) *Attorney, Agent, or Firm*—Davis & Bujold, P.L.L.C.

(57) ABSTRACT

A lightweight regenerative brake having a large braking force is provided. A regenerative brake 1 comprises a brake disc (10) and a pair of stators (20) to perform regenerative braking. This regenerative brake (1) reduces the heat generated in the brake disc (10), because a part of the kinetic energy of a railway car is regenerated by generation of electricity in a tertiary circuit of the power source side when the brake is applied, and consequently the amount of energy converted into heat energy is decreased. Compared to a conventional regenerative brake, this regenerative brake (1) enables the disc (10) to be made thinner and dispenses with a cooling device such as a fan. Accordingly, a small-sizes and lightweight brake having a large braking force can be constituted using this regenerative brake (1).

20 Claims, 7 Drawing Sheets

PRIOR ART

FIG.7

REGENERATIVE BRAKE

TECHNICAL FIELD OF THE INVENTION

This invention relates to a regenerative brake for a railway car.

BACKGROUND OF THE INVENTION

Figure 6:
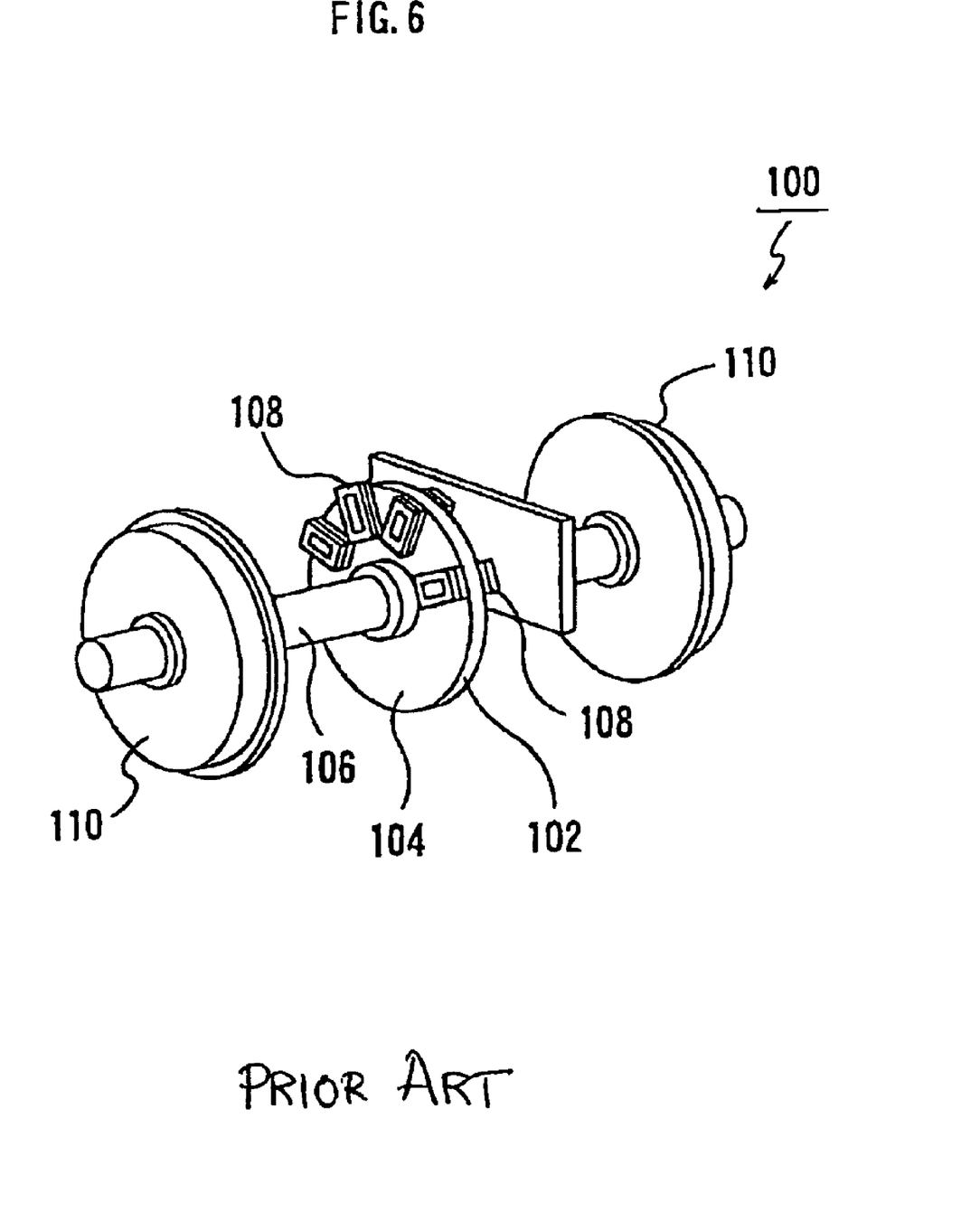
FIG. 6 is a perspective view of a conventional eddy current brake.
Figure 7:
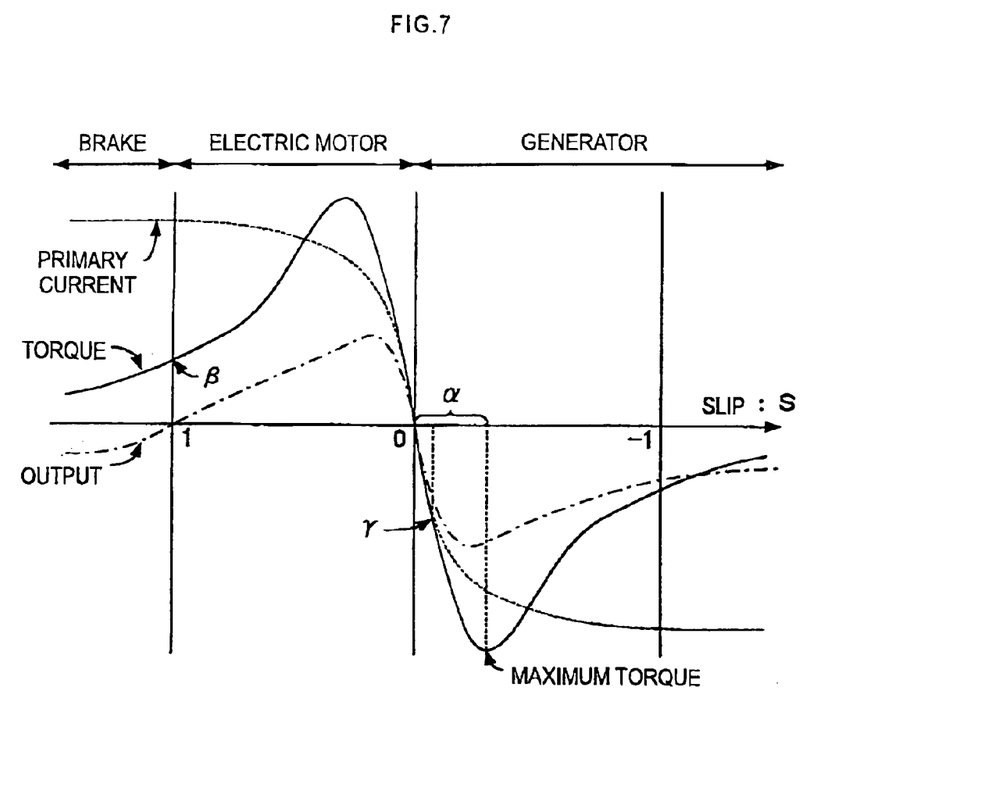
FIG. 7 is a graph showing a characteristic curve of an induction device.

Conventionally, there has been an eddy current brake which performs braking by electromagnetic induction using a three-phase alternating current, as described in the Unexamined Japanese Patent Publication No. 61-266064. As shown in FIG. 6, such an eddy current brake 100 comprises a brake disc 102 attached to an axle 106 so that a disc surface 104 is perpendicular to the axle 106, and a stator 108 which is provided in a position facing the disc surface 104 and which, when excited, generates a moving magnetic field which moves to a direction opposite to a rotation direction of the brake disc 102. The eddy current brake 100 moves the moving magnetic field so that the slip reaches one (1) or more, as shown in FIG. 7. When this moving field excited by the stator 108 generates an eddy current on the disc surface 104, a force operating to a direction opposite to the rotation direction of the brake disc 102 is applied to the brake disc 102 according to the Fleming's left-hand rule, and thus, braking is performed using the force.

In the eddy current brake 100, almost all the kinetic energy of a wheel 110 is converted into heat energy by the eddy current passing on the brake disc 102, and consequently the brake disc 102 becomes hot. However, it is clearly not structurally preferable that a temperature of the brake disc 102 becomes high exceeding a certain temperature. Therefore, in the conventional eddy current brake 100, the brake disc 102 is made thick to increase heat capacity and to facilitate heat radiation. Also, a cooling device such as a fan is provided to cool the brake disc 102 forcibly so as to prevent the brake disc 102 from getting too hot exceeding the certain temperature.

On the other hand, to speed up a railway car of a bullet train, etc., it is necessary to reduce the weight of the car and to enhance the braking force However, the conventional eddy current brake 100 requires thicker brake disc 102 to increase heat capacity, etc. and a fan to be provided to enhance the braking force, thereby resulting in increase in weight.

SUMMARY OF THE INVENTION

One object of the present invention is to provide a regenerative brake for performing braking by electromagnetic induction, which is small-sized and lightweight in spite of the larger braking force compared to a conventional eddy current brake.

In order to attain the above object, the present invention provides a regenerative brake comprising a brake disc attached coaxially to an axle of a wheel of a railway car and a stator for braking provided in a position facing a disc surface of the brake disc, wherein the regenerative brake brakes the brake disc by exciting coils provided on the stator and generating a moving magnetic field which moves to the same direction with a rotation direction of the brake disc at a lower speed than a rotation speed of the brake disc, and, along with the braking, regenerates a part of the kinetic energy of a railway car in the power source side via the stator.

In other words, the regenerative brake of the present invention, if explained with a graph showing a characteristic curve of a conductive device shown in FIG. 7, does not brake when the slip reaches one (1) or more like the conventional eddy current brake but does brake when the slip is less than zero.

When braking is performed when the slip is less than zero as such, a part of the kinetic energy of the railway car is regenerated in the power source side upon braking and the amount of energy converted into heat energy is decreased compared with a case of the eddy current brake described in the prior art, resulting in that less heat is generated in the brake disc. Therefore, with the regenerative brake of the present invention, there is no need to increase heat capacity of the brake disc as in the eddy current brake, and consequently it is possible to form the brake disc thin and to dispense with a cooling device such as a fan.

Accordingly, the regenerative brake of the present invention can be small-sized and lightweight even though the braking force is larger than that of the eddy current brake described in the prior art.

Additionally, it is preferable that the stator is formed as large as it covers a part of the disc surface as in the regenerative brake of the present invention. Formed as such, a heat radiation effect of the brake disc becomes significant and the brake disc can be constituted thinner. Also, no cooling device is required. As a result, the eddy current brake of the present invention can be made small-sized and lightweight.

Particularly, it is preferable that the stator is formed into a sector extending along the circumference of the brake disc and comprises a stator core which is formed to have a plurality of coils provided along the arc of the sector. Such a stator allows the moving field to move along the rotation direction of the brake disc and the braking force to operate along the rotation direction of the brake disc. Therefore, it is possible to apply the braking force to the brake disc efficiently.

As another example, it is preferable that the stator comprises an elongate stator core which is arranged so that the longitudinal length of the stator core is parallel to a traveling direction of the railway car. Such arrangement allows the longitudinal length of the stator core and the traveling direction of the train to be parallel to each other, and consequently, the air passes on the brake disc efficiently. Accordingly, since the heat radiation effect is significant and the brake disc can be made further thinner, the regenerative brake can be made small-sized and lightweight A power car to which a motor is attached, so-called M car, comprises an inductive motor and the inductive motor performs regenerative braking. Therefore, there is no need to attach the eddy current brake of the present invention. However, non-powered car, so-called T car, does not comprise an inductive motor. Therefore, it is significantly important to perform regenerative braking with the eddy current brake of the present invention.

DETAILED DESCRIPTION OF THE PREFERRED EMBODIMENT

The invention will now be described, by way of example, with reference to the accompanying drawings.

Figure 1:
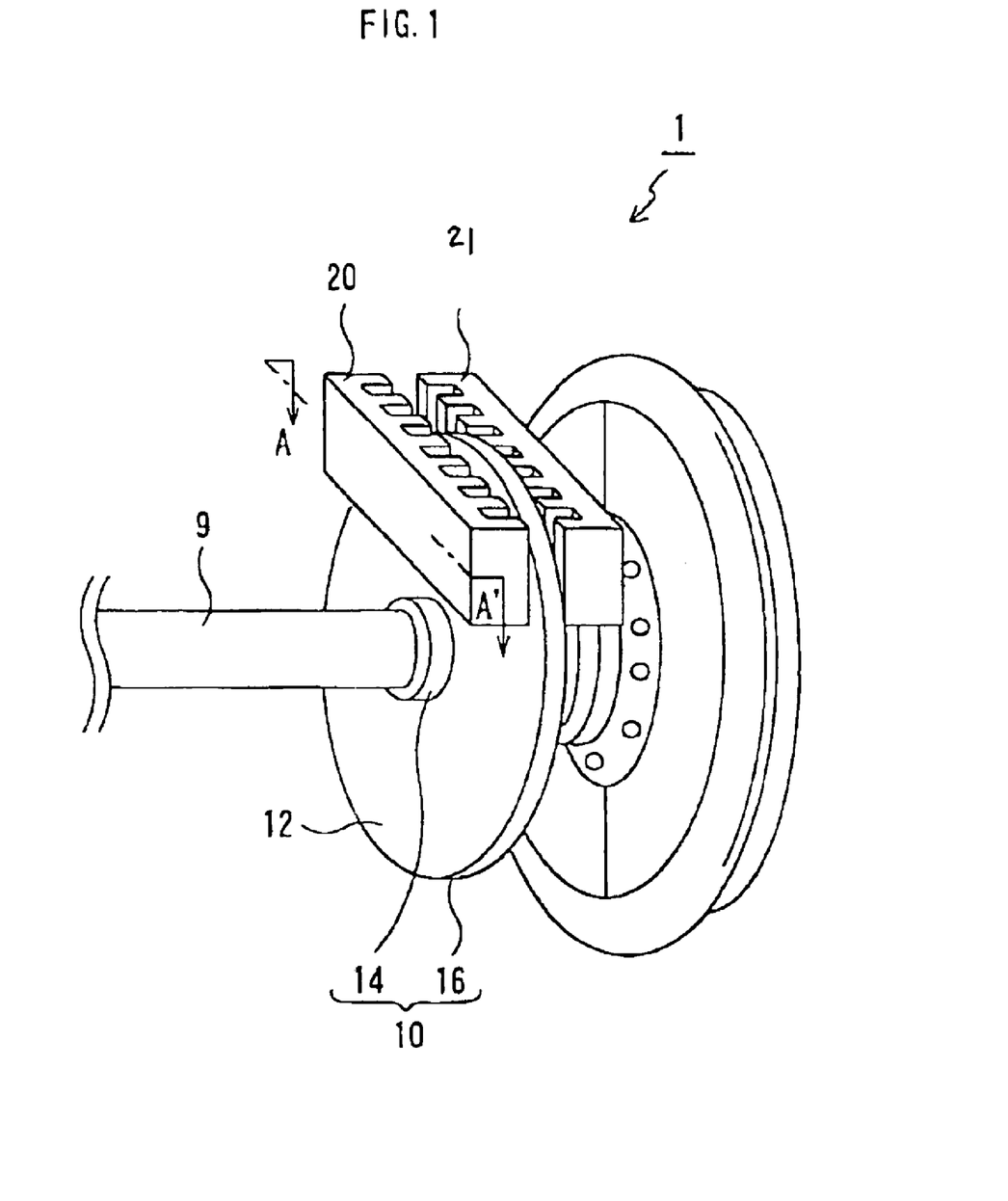
FIG. 1 is a perspective illustration of one end of a wheel to which a regenerative brake of the present embodiment is attached.
Figure 2:
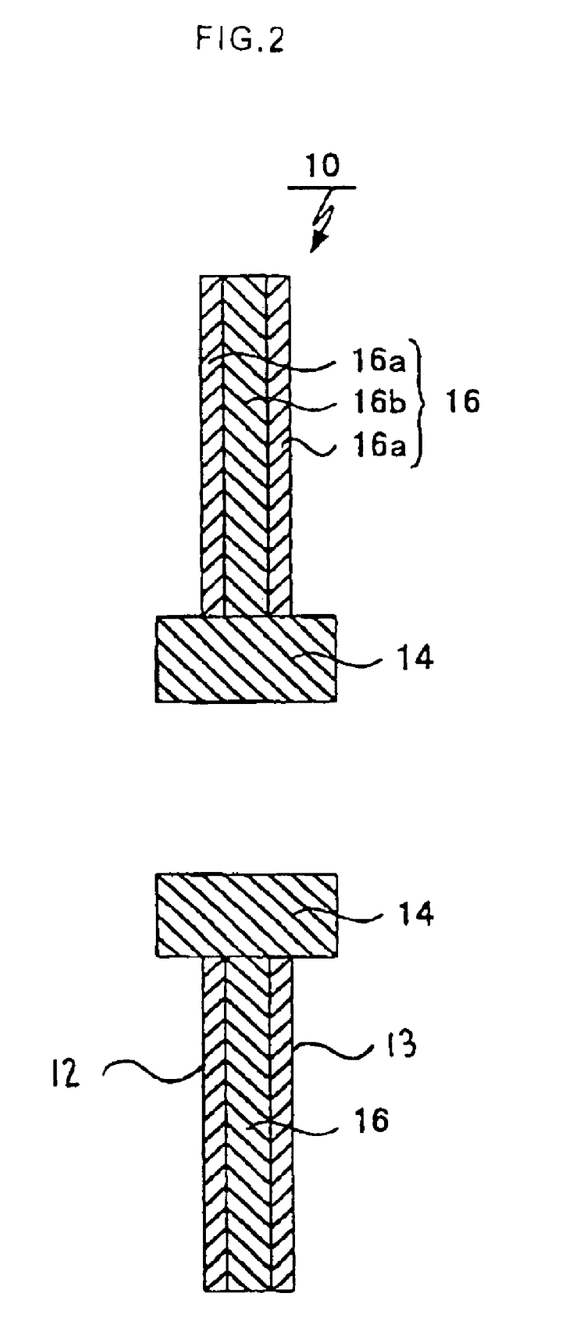
FIG. 2 is a cross sectional view of a brake disc.
Figure 3:
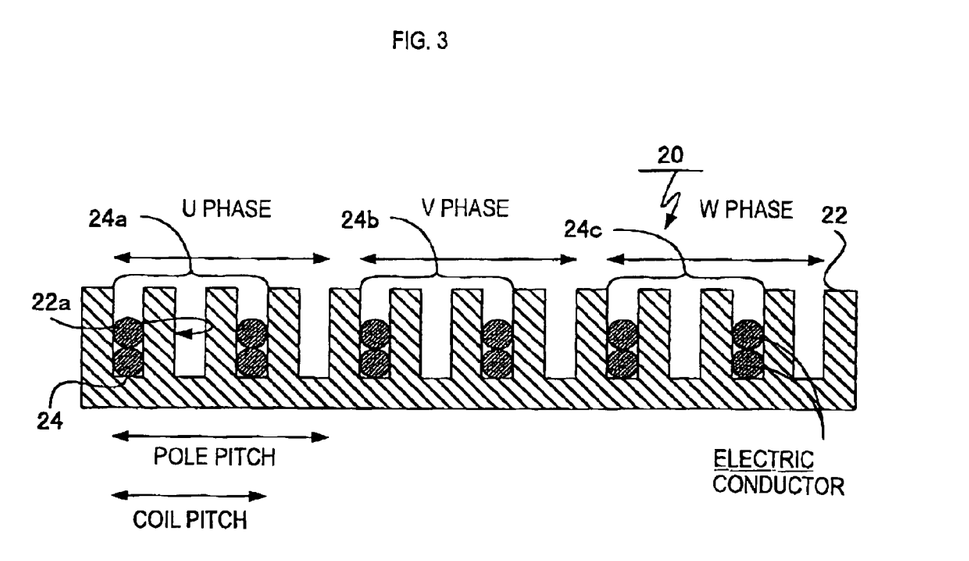
FIG. 3 is a cross sectional view taken along the line A–A' of FIG. 1.
Figure 4:
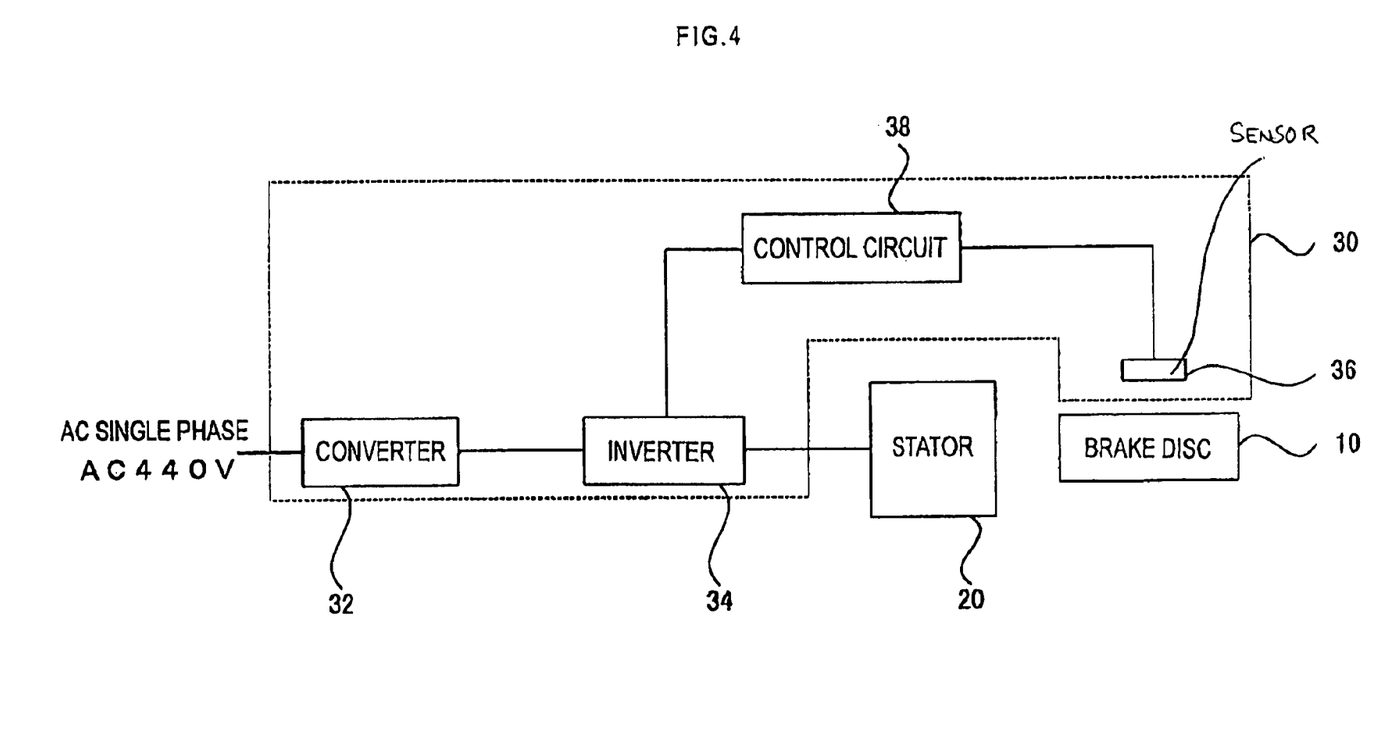
FIG. 4 is a block diagram of an operation circuit.
Figure 5:
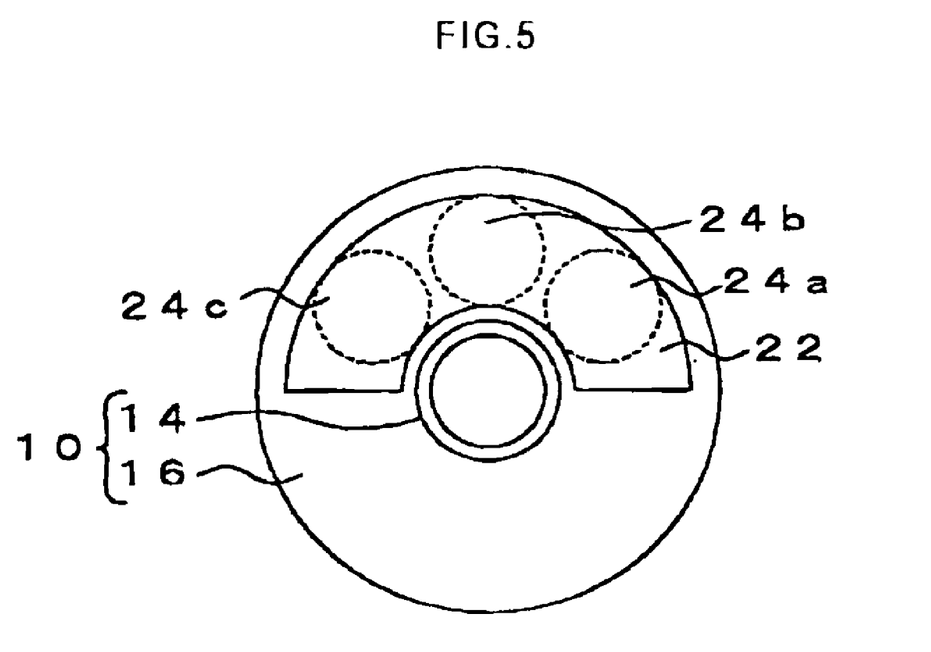
FIG. 5 is a front elevation view of the brake disc for explaining the other example of a stator core.

FIG. 1 is a perspective view of one end of a wheel to which a regenerative brake of the present embodiment is attached, FIG. 2 is a cross sectional view of a brake disc, FIG. 3 is a cross sectional view of a stator (cross sectional view taken along the line A–A' of FIG. 1), FIG. 4 is a block diagram of an operation circuit, and FIG. 5 is a front elevation view of the brake disc.

As shown in FIG. 1, a regenerative brake 1 of the present embodiment comprises a brake disc 10 and a pair of stators 20 and 21.

The brake disc 10 is attached concentrically to an axle 9 provided on a truck of a railway car. The brake disc 10, as shown if FIG. 2 in particular, is composed of a cylindrical portion 14 and a disc portion 16. The disc portion 16 has a first surface 12 and a second surface 13. The cylindrical portion 14 is formed into a circular cylinder, and fixes the brake disc 10 on the axle 9 with the cylindrical portion 14 being fitted on the axle 9. On the other hand, the disc portion 16 is formed in a three-layer structure in which an iron disc 16a is sandwiched between two aluminum discs 16b, and is integrally attached to an outer circumferential surface of the cylindrical portion 14 to be concentric with the cylindrical portion 14. The disc 16a may be composed of any magnetic body having strength such as steel besides iron. The disc 16b may be composed of any non-magnetic body having high conductivity.

The stators 20, 21 are arranged to face a disc surface 12 of the brake disc 10 and to interpose the brake disc 10 above the axle 9. As stators 20, 21 are similar to each other, only the first stator is shown in detail. The stator 20 is composed of a stator core 22 and a stator winding 24, as shown in FIG. 3 in particular. The stator core 22 is formed to extend parallel to a traveling direction of the railway car and to the disc surface 12. On one side of the stator core 22 facing to the disc surface 12, a plurality of slits 22a formed perpendicular to the longitudinal length of the stator core 22 are provided at even intervals along the longitudinal length.

In order to generate a moving field, the stator winding 24 is composed of coils 24a–24c of three phases: U phase, V phase and W phase. The coils 24a–24c are aligned facing to the disk surface 12 of the brake disc 10 along the traveling direction of the railway car so that a winding surface around which a conductive wire composing each of the coils 24a–24c is wound is parallel to the disc surface 12 of the brake disc 10. Each of the coils 24a–24c is formed into a concentrated as well as short-pitch winding and is fit into the slits 22a on the stator core 22 to which the stator winding 24 of each of the phases is to be allocated. Each of the coils 24a–24c is attached to one of the stator cores 22 so that the coils 24a–24c of an equal phase face to each other and so as not to cancel each other's magnetic flux. The present embodiment shows the coils 24a–24c of a short-pitch winding arranged at each coil pitch of three slots to a pole pitch of four slots, as an example. However, other constitutions are also acceptable.

An operation circuit for operating the regenerative brake of the present embodiment is now explained.

FIG. 4 is a block diagram of the operation circuit.

An operation circuit 30 of the present embodiment comprises a converter 32, an inverter 34, a rotation speed sensor 36 and a control circuit 38, as shown in FIG. 4. The converter 32 converts electricity of a single phase 440V of a tertiary winding into a direct current, for use in an auxiliary circuit among the main transformer windings which step down an extra high tension supplied from an overhead wire to be outputted to the inverter 34. The auxiliary circuit is a circuit which supplies electricity to in-vehicle equipment such as an air conditioning apparatus and ventilator.

The inverter 34 converts the direct-current electricity supplied from the converter 32 into a three-phase alternating current by PWM control and outputs the same to the stator winding 24. The converter 32 and the inverter 34 are constituted using an IGBT (insulated gate bipolar transistor) element.

The rotation speed sensor 36 is attached to the brake disc 10 to measure a rotation speed of the brake disc 10, and outputs a speed signal indicating the rotation speed of the brake disc 10 to the control circuit 38. The rotation speed of the brake disc 10 is calculated in the control circuit 38 based on the speed signal inputted from the rotation speed sensor 36, and according to the calculated result, PWM (pulse width modulation) control is performed to operate the inverter 32. In the PWM control, the stator winding 24 is excited and a moving magnetic field is generated which moves at a speed lower than the rotation speed of the brake disc 10 calculated by the control circuit 38 to the same direction as the rotation.

In the operation circuit 30, the tertiary circuit which consumes power supplied from the stator winding 24 upon regenerative braking and converted into a direct current in the inverter 34 may be inserted between the converter 32 and the inverter 34. Also in the operation circuit 30, if the power of the auxiliary circuit has already been a direct current, the electricity may be supplied directly to the inverter 32, and not via converter 32.

If the regenerative brake 1 constituted as the above is controlled using the operation circuit 30, it operates as follows.

When the regenerative brake 1 of the present embodiment started to brake, an electric current is passed to the coils 24a–24c provided on the stators 20 by PWM control. Then, a moving field is generated which moves at a speed lower than the rotation speed of the brake disc 10 to the same direction as the rotation direction of the brake disc 10 through the disc 16b of the brake disc 10, and an eddy current is generated on the brake disc 10. As a result, a force is applied to a direction opposite to the rotation direction according to the Fleming's left-hand rule, and this force becomes a braking force to brake the brake disc 10.

This braking is a regenerative braking and kinetic energy of the railway car is partly converted into electricity. The electricity is converted into a direct current in the inverter 34 which serves as a converter, and is outputted to the power source side. The kinetic energy is partly converted into heat energy to heat the brake disc 10.

The following effects are expected when the regenerative brake 1 as explained above is used.

As above described, if braking is performed when the slip is less than zero, a part of the kinetic energy of the railway car is regenerated in the power source side upon braking and the amount of energy converted into heat energy is decreased compared to that in case of the eddy current brake described in the prior art, resulting in that less heat is generated in the brake disc. Therefore, there is no need to increase heat capacity of the brake disc 10 with the regenerative brake of the present invention as in the eddy current brake, and consequently it is possible to form the brake disc thin and to dispense with a cooling device such as a fan. Accordingly, the regenerative brake 1 of the present embodiment can be constituted small-sized and lightweight compared to the eddy current brake described in the prior art even if the braking force is increased.

The regenerative brake 1 of the present embodiment is formed as large as it covers a part of the disc surface of the brake disc 10. Therefore, a dramatic heat radiation effect can be achieved which allows production of the thinner brake disc 10 and lack of a cooling device. As a result, the eddy current brake of the present embodiment can be constituted small-sized and lightweight compared to the conventional eddy current brake.

In the present embodiment, the longitudinal length of the stator core 22 and the traveling direction of the train is parallel to each other and thereby the air passes on the brake disc 10 efficiently. Accordingly, since a dramatic heat radiation effect can be achieved compared to the conventional eddy current brake and therefore the brake disc 10 can be made further thinner, the regenerative brake 10 of the present embodiment can be constituted smaller-sized and lighter-weight than the conventional eddy current brake.

The stator core 22 may be formed into a sector extending along the circumference of the brake disc 10 and the coils 24a–24c may be arranged along the circumference of the sector as shown in FIG. 5. In this manner, the moving magnetic field moves along the rotation direction of the brake disc 10 and the braking force operates along the rotation direction of the brake disc 10. Then, the braking force can be applied to the brake disc 10 efficiently.

It is not necessary to provide a power car to which a motor is attached, so-called M car, with the regenerative brake of the present embodiment, since the M car comprises an induction motor which performs regenerative braking. However, there is a significant importance in providing a non-powered car, so-called T car, with the regenerative brake of the present embodiment and performing regenerative braking, since the T car does not comprise an induction motor.

It is known that a braking force of the conventional eddy current brake gets small if a rotation speed of a rotor, namely, the brake disc 10, is slow, and consequently, a control brake does not work when a speed of a railway car is equal to or under 70 km per hour.

It is then preferable as in the present embodiment that the moving speed of the moving magnetic field generated in the stator 20 may be controlled so that, as shown in FIG. 7, the slip S to the rotation speed of the brake disc 10 corresponding to a rotor is, among a range α of FIG. 7, within a range of values between the value at which the same torque value (γ, point in FIG. 7) with the maximum torque value (β point in FIG. 7) when the induction device is treated as a brake is obtained and the value at which the maximum torque can be obtained, for example.

In this manner, it is possible to obtain an extremely high torque, that is, braking force, in spite of the low rotation speed of the rotor. Further in this manner, despite the high braking force, braking requires less primary current. Accordingly, generation of heat in the brake disc 10 is reduced and the brake disc 10 can be thinner. As a result, the regenerative brake 1 of the present embodiment can be made lightweight.

The present invention should not be limited to the described embodiment, and other modifications and variations might be possible without departing from the scope of the invention.

For instance, the rotation speed sensor 26 measures the rotation speed of the brake disc 10 in the present embodiment. However, if in advance a table which shows relevancy between the train speed and the rotation speed of the brake disc 10 is provided and calculation of the moving speed of the moving magnetic field is possible as a result of measuring the train speed, thus PWM control may be directly performed based on the train speed by removing the rotation speed sensor 26

In addition, the converter 32 and the inverter 34 are composed of an IGBT element in the present embodiment. However, they may be composed of an electric semiconductor such as a GTO thyristor (gate turn-off thyristor), etc.

Moreover, although a short-pitch winding is described in the present embodiment, other windings such as a distributed winding, etc may be utilized.

INDUSTRIAL AVAILABILITY

As described in details in the above, the regenerative brake of the present invention can be constituted small-sized and lightweight in spite of a large braking force compared with the conventional eddy current brake.

What is claimed is:

1. A regenerative brake comprising:
    a brake disc attached to an axle of a railway car, comprising
        a first disc surface;
        a second disc surface;
    a first stator comprising three or more first stator coils directly opposing the first disc surface;
    a second stator comprising three or more second stator coils directly opposing the second disc surface;
    a rotation speed sensor for measuring a rotational speed of the brake disc;
    an inverter; and
    a control circuit;
    wherein the regenerative brake opposes rotation of the brake disc by exciting the three or more first stator coils and the three or more second stator coils across the brake disc, thereby generating a moving magnetic field,
    the rotation speed sensor measures the rotational speed of the brake disc;
    the control circuit causes the generated moving magnetic field to move at a slower speed than the rotational speed of the brake disc;
    a portion of kinetic energy, resulting from motion of the railway car, is converted to electricity by the first stator and the second stator;
    the electricity generated by the first and second stators is supplied to the inverter;
    the inverter converts the electricity into direct-current electricity; and
    the direct-current electricity is supplied to an electrical system for the railway car.

2. The regenerative brake according to claim 1, wherein the first stator is formed so as to directly oppose one half of the first disc surface of the brake disc, and
    the second stator is formed so as to directly oppose one half of the second disc surface of the brake disc.

3. The regenerative brake according to claim 2, wherein the first stator is formed into a first sector extending along a circumference of the brake disc and comprises:

a first stator core in which the three or more first coils are provided along an arc of the first sector, and the second stator is formed into a second sector extending along a circumference of the brake disc and comprises;

a second stator core in which the three or more second coils are provided along an arc of the second sector.

4. The regenerative brake according to claim 2, wherein the first and second stators comprise respective elongate first and second stator cores which are arranged so that a longitudinal length of the respective first and second stator cores extend parallel to a tangent to a direction of movement of the railway car.

5. The regenerative brake according to claim 1, wherein the regenerative brake is supplied for a non-powered railway car to facilitate braking of the non-powered railway car.

6. The regenerative brake according to claim 1, wherein the brake disc further comprises:

a three-layer structure in which a magnetic core is sandwiched between two aluminum discs; and the control circuit controlling movement of the magnetic field along a circumference of the brake disc at a speed slower than the rotational speed of the brake disc and a speed of movement of the magnetic field being dependent upon the rotational speed of the brake disc.

7. The regenerator brake according to claim 6, wherein the magnetic core is iron.

8. The regenerative brake according to claim 6, wherein the magnetic core is steel.

9. The regenerative brake according to claim 1, wherein when a slip value of the regenerative brake reaches 1, the regenerative brake fails to apply a braking force.

10. The regenerative brake according to claim 1, wherein when a slip value of the regenerative brake ranges from 0 to −1, the regenerative brake applies a braking force.

11. A regenerative brake comprising:

a brake disc attached to an axle of a railway car, the brake disc having a first and second opposed surfaces;

a first stator having at least three first stator coils located adjacent the first disc surface;

a second stator having at least three second stator coils located adjacent the second disc surface;

a rotational speed sensor for measuring the rotational speed of the brake disc;

a control circuit electrically coupled with the rotational speed sensor;

an inverter electrically coupled with the first and second stators and the control circuit, the regenerative brake retards rotation of the brake disc, during operation of the regenerative brake, by exciting the at least three first stator coils and the at least three second stator coils across the brake disc, thereby generating a magnetic field, the control circuit generating the magnetic field and controlling movement of the magnetic field along a circumference of the brake disc at a speed slower than the rotational speed of the brake disc to generate a braking effect on the rotating brake disc with a speed of movement of the magnetic field being dependent upon the rotational speed of the brake disc; and the first stator and the second stator converting kinetic energy of the railway car to electricity which is supplied to the inverter, the inverter converts the electricity to a direct current electricity which is supplied to an electrical system of the railway car.

12. The regenerative brake according to claim 11, wherein the first stator is arcuate in shape and concentric with the first surface of the brake disc and the first stator has a radius similar to a radius of the first disc surface, and the second stator is arcuate in shape and concentric with the second surface of the brake disc and the second stator has a radius similar to a radius of the second disc surface.

13. The regenerative brake according to claim 12, wherein the first stator extends circumferentially about the brake disc and has a first stator core in which the at least three first stator coils are provided along an arc thereof; and the second stator extends circumferentially about the brake disc and has a second stator core in which the at least three second stator coils are provided along an arc thereof.

14. The regenerative brake according to claim 12, wherein the first and second stators comprise respectively elongate first and second stator cores which are arranged so that a longitudinal length of the respective first and second stator cores extend parallel to a tangent to a direction of movement of the railway car.

15. The regenerative brake according to claim 11, wherein the regenerative brake is provided on a non-powered railway car to facilitate braking of the non-powered railway car.

16. The regenerative brake according to claim 11, wherein the brake disc further comprises a three-layer structure in which a central magnetic core layer is sandwiched between two aluminum disc layers.

17. The regenerator brake according to claim 16, wherein the central magnetic core layer comprises iron.

18. The regenerative brake according to claim 16, wherein the central magnetic core layer comprises steel.

19. The regenerative brake according to claim 11, wherein the regenerative brake does not apply a braking force when a slip value of the regenerative brake is 1 or greater.

20. The regenerative brake according to claim 11, wherein regenerative brake applies a braking force when a slip value of the regenerative brake is ranges from 0 to −1.

* * * * *